United States Patent Office 3,591,589
Patented July 6, 1971

3,591,589
6-DIALKYLAMINOALKOXY - 2-ARYL-4-CHLORO-PYRIMIDINES AND 6-DIALKYLAMINOALKYL-THIO-2-ARYL-4-CHLOROPYRIMIDINES
Dong H. Kim and Arthur A. Santilli, Delaware, Pa., assignors to American Home Products Corporation, New York, N.Y.
No Drawing. Continuation-in-part of application Ser. No. 642,142, May 29, 1967. This application Apr. 8, 1969, Ser. No. 814,448
Int. Cl. C07d 51/36
U.S. Cl. 260—256.4          10 Claims

ABSTRACT OF THE DISCLOSURE

This disclosure is concerned with 6-dialkylaminoalkoxy-2-aryl-4-chloropyrimidine and 6-dialkylaminoalkylthio-2-aryl-4-chloropyrimidine compounds which are active as antiamoebic agents in vitro.

---

This application is a continuation-in-part of application Ser. No. 642,142, filed May 29, 1967 (now abandoned).

This invention relates to new and novel pyrimidines. In particular, the present invention is concerned with 6-dialkylaminoalkoxy-2-aryl-4-chloropyrimidine and 6-dialkylaminoalkylthio-2-aryl-4-chloropyrimidine compounds which are active against *Endameba histolytica* in vitro.

The novel compounds which are included within the purview of this invention are selected from the group having the general formula:

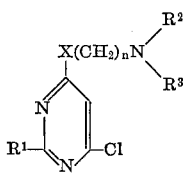

wherein $R^1$ is aryl, for example, phenyl, halophenyl, dihalophenyl, lower alkylphenyl, lower alkoxyphenyl, nitrophenyl and aminophenyl; $R^2$ and $R^3$ lower alkyl; X is an atom selected from the group consisting of oxygen and sulfur; and $n$ is an integer from 2 to 6 and the pharmaceutically acceptable acid addition salts thereof, with the proviso that when X is sulfur and $n$ is 2, $R^1$ is not phenyl. Typical examples thereof are: 4-chloro-2-(3,4-dichlorophenyl) - 6 - [2 - (dimethylamino)ethoxy]pyrimidine; 4-chloro - 2 - (4 - chlorophenyl) - 6 - [2 - dimethylamino)ethoxy]pyrimidine; and 4 - chloro - 2 - (3 - chlorophenyl)-6-[2-(diethylamino)ethylthio]pyrimidine.

The new and novel 6-dialkylaminoalkoxy-2-aryl-4-chloropyrimidines (III) of this invention may be prepared by the process which is schematically illustrated, as follows:

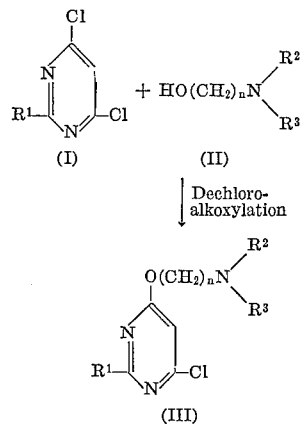

wherein $R^1$, $R^2$, $R^3$ and $n$ are defined as above. The dechloroalkoxylation reaction is effected by slowly admixing with stirring an appropriate 2-aryl-4,6-dichloropyrimidine (I) with a dialkylaminoalkanol (II) at a temperature range from about 20° C. to about 50° C. over a period of about five to about thirty minutes. Preferably this reaction is conducted with gentle heating by the addition of the 2-aryl-4,6-dichloropyrimidine to the dialkylaminoalkanol over a period of about five minutes. When the dialkylaminoalkanol is a liquid, no solvent is required. Alternatively, if both reactants are solids the reaction is conducted in a reaction-inert organic solvent e.g. an alkane.

When the dechloroalkoxylation reaction is complete, the reaction mixture is poured into water, and the product separated by filtration. Thereafter, the desired 6-dialkylaminoalkoxy-2-aryl-4-chloropyrimidine (III) is purified by conventional methods, such as, washing with water and crystallization from a suitable solvent e.g. an alkane.

The 6-dialkylaminoalkylthio - 2 - aryl - 4 - chloropyrimidines (V) of this invention may be prepared by the process which is depicted by the following reaction scheme:

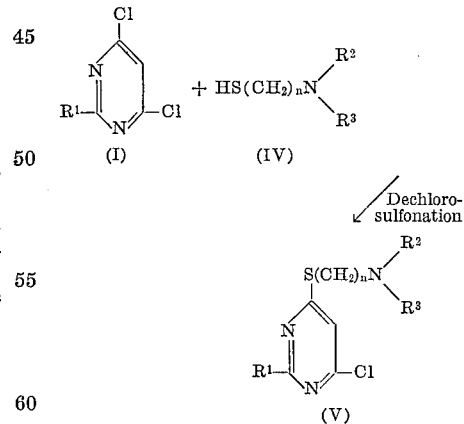

wherein $R^1$, $R^2$, $R^3$ and $n$ are defined as above. The dechlorosulfonation reaction is effected by refluxing a dialkylaminoalkanethiol mineral acid salt (IV)) e.g. a hydrochloride salt with an anhydrous alkali metal carbonate e.g. potassium carbonate and sodium carbonate in an appropriate organic solvent, for example, dimethylformamide and dimethylacetamide for about one hour. Thereafter, an appropriate 2-aryl-4,6-dichloropyrimidine (I) is added to the mixture and the reflux continued for about another hour.

When the dechlorosulfonation reaction is complete, the reaction mixture is poured into water, extracted with ether and the ether extracts evaporated to dryness to afford the desired 6-dialkylaminoalkylthio-2-aryl-4-chloropyrimidine (V) which may be purified by conventional methods well known to those skilled in the art. Alternatively, the hydrochloride salt thereof may be prepared by dissolving the reaction product (V) in a mixture of absolute ethanol and anhydrous ether and passing dry hydrogen chloride gas through the resulting solution for several minutes. The precipitate is the desired hydrochloride salt of the 6-dialkylaminoalkylthio-2-aryl-4-chloropyrimidine (V) which may be separated by filtration and further purified by recrystallization from a suitable solvent, i.e. an alkanol.

Many of the reactants employed in the process of this invention are known compounds which are available from commercial sources, while the remainder can be prepared in accordance with standard organic procedures well known to those skilled in the art. In this regard, the 2-aryl-4,6-dichloropyrimidine (I) reactants may be prepared by the process described in copending U.S. patent application, Ser. No. 590,198, now U.S. Pat. No. 3,498,984, filed on Oct. 28, 1966, entitled "4-Amino-2-Phenyl-6-Thiopyrimidines."

Screening of compounds for activity against *Endameba histolytica* is carried out by the following procedure: Test substance is incorporated and diluted in aqueous phase of modified Boeck-Drbohlav diphasic medium fortified with rice starch. The medium is inoculated with polybacteria and a known number of trophozoites of *Endameba histolytica* NIH 200. After 48 hours incubation at 35° C., the trophozoites are counted. The minimal inhibitory concentration (MIC) in micrograms per milliliter ($\mu$g./ml.) is the least amount of test substance that completely inhibits *Endameba histolytica*.

In the foregoing procedure compounds of the present invention were found to have an MIC of 15.6 to 1,000 $\mu$g./ml.

The following examples are given by way of illustration and are not to be construed as limitations of this invention, variations of which are possible without departing from the scope and spirit thereof. The following abbreviations are used: "g." for "grams," "ml." for "milliliters."

EXAMPLE I

Seven grams of 4,6-dichloro-2-(3,4-dichlorophenyl)pyrimidine are added in small portions over a period of five minutes to 25 ml. of 2-dimethylaminoethanol with gentle heating and stirring. An exothermic reaction takes place during the addition. The heating and stirring is continued six more minutes, then poured into 700 ml. of water with stirring. The oil which first separates becomes solid on standing. This material is collected on a filter and washed with water several times. The product weighs 7.95 g. and has a melting point of 78–82° C. Two recrystallizations from heptane affords 4-chloro-2-(3,4-dichlorophenyl)-6-[2 - (dimethylamino)ethoxy]pyrimidine, M.P. 83.5–86.5° C.

*Analysis.*—Calculated for $C_{14}H_{14}Cl_3N_3O$ (percent): C, 48.51; H, 4.07; N, 12.12; Cl, 3.07. Found (percent): C, 48.49; H, 4.19; N, 12.06; Cl. 30.4.

In the test procedure described above the product was found to have an MIC of 250 $\mu$g./ml.

In a similar manner, 4,6-dichloro-2-(3,4-dibromophenyl)pyrimidine is reacted with 2-diethylaminoethanol to afford 2-(3,4-dibromophenyl) - 4 - chloro-6-[2 - (diethylamino)ethoxy]pyrimidine.

EXAMPLE II

Reacting 1.7 g. of 4,6-dichloro-2-(4-chlorophenyl)pyrimidine and 15 ml. of 2-dimethylaminoethanol, and recrystallizing the product from heptane affords 1.0 g. of 4-chloro-2-(4-chlorophenyl) - 6 - [2-(dimethylamino)ethoxy]pyrimidine, having a melting point of 55–57° C.

*Analysis.*—Calcd. for $C_{14}H_{14}Cl_2N_3O$ (percent): C, 53.86; H, 4.84; N, 13.46; Cl, 22.71. Found (percent): C, 54.08; H, 4.85; N, 13.28; Cl, 22.7.

In the test procedure described above the product was found to have an MIC of 15.6 $\mu$g./ml.

Similarly, the following compounds are prepared: 2-(4-bromophenyl)-4-chloro - 6 - [3-(dimethylamino)propoxy]pyrimidine; 4-chloro-2 - (3-fluorophenyl)-6-[2-(dipropylamino)ethoxy]pyrimidine; 4 - chloro - 2-(4-chlorophenyl)-6-[4-(dimethylamino)butoxy]pyrimidine; 4-chloro-2-(4-iodophenyl)-6-[2 - (methylpropylamino)ethoxy]pyrimidine; and 4-chloro-2-(3-chlorophenyl)-6-[2-(ethylmethylamino)ethoxy]pyrimidine.

EXAMPLE III

Fourteen grams of 2-(4-aminophenyl) - 4,6 - dichloropyrimidine is added in small portions over a period of ten minutes to 50 ml. of 2-dimethylaminoethanol with gentle heating and stirring. The heating and stirring is continued thirty more minutes, then poured into 1500 ml. of water with stirring. The oil which first separates becomes solid on standing. This material is collected on a filter, washed with water several times and recrystallized from heptane to afford 2-(4-aminophenyl)-4-chloro-6-[2-(dimethylamino)ethoxy]pyrimidine.

In the same manner, interacting 4,6-dichloro-2-(3-nitrophenyl)pyrimidine with 2-dimethylaminoethanol yields 4-chloro-6-[2-(diethylamino)ethoxy] - 2-(3-nitrophenyl)pyrimidine.

EXAMPLE IV

Six grams of 4,6-dichloro-2-(4-methoxyphenyl)pyrimidine is added in small portions over a period of one-half hour to 30 ml. of 2-dimethylaminoethanol with stirring at room temperature. When the exothermic reaction is complete the reaction mixture is poured into 750 ml. of water. The resulting precipitate is collected by filtration, washed with water and recrystallized from n-pentane to yield 2.6 g. of 4-chloro-6-[2-(dimethylamino)ethoxy]-2-(4-methoxyphenyl)pyrimidine having a melting point of 58–61° C.

*Analysis.*—Calcd. for $C_{15}H_{18}ClN_3O_2$ (percent): C, 58.54; H, 5.89; N, 13.65; Cl, 11.52. Found (percent): C, 58.11; H, 6.03; N, 13.87; Cl, 11.2.

In the test procedure described above the product was found to have an MIC of 1,000 $\mu$g./ml.

In the same manner, 4,6-dichloro-2-(4-ethoxyphenyl)pyrimidine is reacted with 4-dimethylaminopropanol to afford 4-chloro-2-(4-ethoxyphenyl)-6-[3-(dimethylamino)propoxy]pyrimidine.

EXAMPLE V

Reacting 14.0 g. of 4,6-dichloro-2-(3-chlorophenyl)pyrimidine with 60 ml. of 2-dimethylaminoethanol as described in Example IV, and twice recrystallizing the product from heptane affords 4.0 g. of 4-chloro-2-(3-chlorophenyl) - 6-[2-(dimethylamino)ethoxy]pyrimidine having a melting point of 63–65° C.

*Analysis.*—Calcd. for $C_{14}H_{15}Cl_2N_3O$ (percent): C, 53.86; H, 4.84; Cl, 22.71; N, 13.46. Found (percent): C, 53.81; H, 4.70; Cl, 22.6; N, 13.24.

In the test procedure described above the product was found to have an MIC of 250 $\mu$g./ml.

The hydrochloride salt of the above prepared pyrimidine is obtained by dissolving the above compound in absolute ethanol and then passing dry hydrogen chloride gas through the solution. A precipitate is obtained which is recrystallized twice from absolute ethanol to afford 4-chloro-2-(3-chlorophenyl)-6-[2-(dimethylamino)ethoxy]pyrimidine hydrochloride, which decomposes at 213–216° C.

*Analysis.*—Calcd. for $C_{14}H_{15}Cl_2N_3O \cdot HCl$ (percent): C, 48.23; H, 4.62; Cl, 30.51; N, 12.05. Found (percent): C, 48.34; H, 4.62; Cl, 30.6; N, 12.36.

EXAMPLE VI

Ten grams of 4,6-dichloro-2-phenylpyrimidine are added to 30 ml. of 2-dimethylaminoethanol, with stirring and gentle heating over a five minute interval. An exothermic reaction takes place during the addition. The heating is continued for about twenty minutes more, and then the clear reaction solution is added slowly with stirring to 700 ml. of water. The oily layer which separates is extracted with ether. The ether layer is dried over anhydrous magnesium sulfate and filtered. Dry hydrogen chloride gas is then passed through the filtrate resulting in the formation of a hygroscopic precipitate, which is recrystallized twice from absolute ethanol to yield 4-chloro-6-[2-(dimethylamino)ethoxy]-2-phenylpyrimidine hydrochloride having a melting point of 198–200° C.

*Analysis.*—Calcd. for $C_{14}H_{16}ClN_3O \cdot HCl$ (percent): C, 53.51; H, 5.45; Cl, 22.57; N, 13.37. Found (percent): C, 53.36; H, 5.41; Cl, 22.6; N, 13.66.

In the test procedure described above the product was found to have an MIC of 250 µg./ml.

Similarly, reacting 4,6-dichloro-2-phenylpyrimidine with 5-dimethylamino-pentanol affords 4-chloro-6-[5-(dimethylamino)pentoxy]-2-phenylpyrimidine.

EXAMPLE VII

Twenty grams of 4,6-dichloro-2-(4-tolyl)pyrimidine are added to 30 ml. of 2-dimethylaminoethanol, with stirring and gentle heating over a ten minute interval. An exothermic reaction takes place during the addition. The heating is continued for about thirty minutes more, and then the clear reaction solution is added slowly with stirring to 700 ml. of water. The oily layer which separates is extracted with ether. The ether layer is dried over anhydrous magnesium sulfate and filtered. Dry hydrogen chloride gas is then passed through the filtrate resulting in the formation of a precipitate, which is recrystallized twice from absolute ethanol, to afford 4-chloro-6-[2-(dimethylamino)ethoxy]-2-(4-tolyl)pyrimidine hydrochloride.

In a similar manner, 4,6-dichloro-2-(4-ethylphenyl)pyrimidine is reacted with 2-ethylmethylaminoethanol to afford 4-chloro-2-(4-ethylphenyl)-6-[2-(ethylmethylamino)ethoxy]pyrimidine.

EXAMPLE VIII

A mixture of 4.5 g. of diethylaminoethanethiol, hydrochloride and 2.4 g. of anhydrous sodium carbonate in 25 ml. of dimethylformamide is heated to reflux for forty-five minutes. To the resulting mixture is added 5.2 g. of 4,6-dichloro-2-(3-chlorophenyl)pyrimidine. After an additional hour of refluxing the reaction mixture is poured into 700 ml. of water. The resultant milky solution is extracted with ether three times, then the combined ether extracts are washed with water. Evaporation of the ether results in an oily residue containing some solid particles. Filtration under suction affords an amber oil which is dissolved in a mixture of absolute ethanol and anhydrous ether into which dry hydrogen chloride gas is passed for a few minutes. The precipitate which results is collected on a filter and washed with dry ether. Recrystallization from absolute ethanol affords 4-chloro-2-(3-chlorophenyl)-6-[2-(diethylamino)ethylthio]pyrimidine hydrochloride having a melting point of 220.5–223° C.

*Analysis.*—Calcd. for $C_{16}H_{19}Cl_2N_3S \cdot HCl$ (percent): C, 48.92; H, 5.13; N, 10.70; Cl, 27.08; S, 8.16. Found (percent): C, 49.16; H, 5.43; N, 11.01; Cl, 27.1; S, 8.2.

In the test procedure described above the product was found to have an MIC of 250 µg./ml.

EXAMPLE IX

A mixture of 9.0 g. of dimethylaminoethanethiol, hydrochloride and 5.0 g. of anhydrous sodium carbonate in 50 ml. of dimethylformamide is heated to reflux for one-half hour. To the resulting mixture is added 10.0 g. of 4,6-dichloro-2-(4-tolyl)pyrimidine. After an additional hour of refluxing the reaction mixture is poured into 700 ml. of water. The resultant solution is extracted with ether three times, then the combined ether extracts are washed with water. Evaporation of the ether results in an oily residue. Filtration under suction affords an oil which is dissolved in a mixture of absolute ethanol and anhydrous ether into which dry hydrogen chloride gas is passed for a few minutes. The precipitate which results is collected on a filter and washed with dry ether. Recrystallization from absolute ethanol affords 4-chloro-6-[2-(dimethylamino)ethylthio]-2-(4-tolyl)pyrimidine hydrochloride.

EXAMPLE X

Repeating the procedure of Examples VIII and IX to react an appropriate di(lower)alkylamino(lower)alkanethiol with a 4,6-dichloro-2-phenylpyrimidine, the following compounds are prepared:

4-chloro-2-(3,4-dichlorophenyl)-6-[2-(dimethylamino)ethylthio]pyrimidine;
2-(3,4-dibromophenyl)-4-chloro-6-[2-(diethylamino)ethylthio]pyrimidine;
4-chloro-2-(4-chlorophenyl)-6-[2-(dimethylamino)ethylthio]pyrimidine;
2-(4-bromophenyl)-4-chloro-6-[3-(dimethylamino)propylthio]pyrimidine;
4-chloro-6-[2-(dimethylamino)ethylthio]-2-(4-methoxyphenyl)pyrimidine;
4-chloro-2-(3-chlorophenyl)-6-[2-(dimethylamino)ethylthio]pyrimidine;
4-chloro-6-[2-(dimethylamino)ethylthio]-2-phenylpyrimidine; and
4-chloro-6-[2-(dimethylamino)ethylthio]-2-(4-tolyl)pyrimidine.

EXAMPLE XI

The hydrobromide salt of 4-chloro-2-(3,4-dichlorophenyl)-6-[2-(dimethylamino)ethoxy]pyrimidine is prepared by admixing a methanolic solution of this compound with an aqueous solution containing an excess of hydrobromic acid and, thereafter, evaporating the solvent under vacuum.

Other acid addition salts of the new pyrimidines of the present invention described in the above examples are prepared by the same procedure employing hydrobromic acid, sulfuric acid, phosphoric acid, acetic acid, tartaric acid, maleic acid and gluconic acid.

What is claimed is:

1. A compound selected from the group consisting of those having the formula:

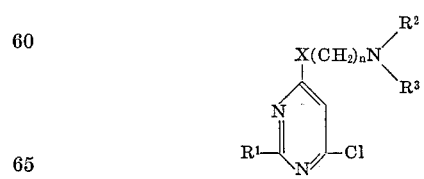

wherein $R^1$ is selected from the group consisting of phenyl, halophenyl, dihalophenyl, lower alkylphenyl, lower alkoxyphenyl, nitrophenyl and aminophenyl; $R^2$ and $R^3$ are lower alkyl; X is an atom selected from the group consisting of oxygen and sulfur; and $n$ is an integer from 2 to 6 and the pharmaceutically acceptable acid addition salts thereof, with the proviso that when X is sulfur, and $n$ is 2, $R^1$ is not phenyl.

2. A compound as described in claim 1 which is: 4-chloro-2 - (3,4 - dichlorophenyl) - 6-[2-(dimethylamino)ethoxy]pyrimidine.

3. A compound as described in claim 1 which is: 4-chloro-2-(4 - chlorophenyl) - 6 - [2-(dimethylamino)ethoxy]pyrimidine.

4. A compound as described in claim 1 which is: 4-chloro-6-[2 - (dimethylamino)ethoxy] - 2 - (4-methoxyphenyl)pyrimidine.

5. A compound as described in claim 1 which is: 4-chloro - 2 - (3-chlorophenyl) - 6-[2-(dimethylamino)ethoxy]pyrimidine.

6. A compound as described in claim 1 which is: 4-chloro - 6 - [2-(dimethylamino)ether] - 2 - phenylpyrimidine hydrochloride.

7. A compound as described in claim 1 which is: 4-chloro-2-(3 - chlorophenyl) - 6 - [2 - (diethylamino)ethylthio]pyrimidine hydrochloride.

8. A compound as described in claim 1 which is: 4-chloro-6-[2 - (dimethylamino)ethylthio] - 2 - (4-tolyl)pyrimidine.

9. A compound as described in claim 1 which is: 4-chloro-2-(3,4 - dichlorophenyl) - 6-[2-(dimethylamino)ethylthio]pyrimidine.

10. A compound as described in claim 1 which is 4 - chloro-6 - [2 - (dimethylamino)ethylthio] - 2 - (4-methoxyphenyl)pyrimidine.

References Cited

Bayer, Chem. Abstracts, 1962, vol. 56. col. 5984–5.

ALEX MAZEL, Primary Examiner

R. J. GALLAGHER, Assistant Examiner

U.S. Cl. X.R.

260—251, 265.5; 424—251